US006889009B2

(12) United States Patent
Willebrand

(10) Patent No.: US 6,889,009 B2
(45) Date of Patent: May 3, 2005

(54) INTEGRATED ENVIRONMENTAL CONTROL AND MANAGEMENT SYSTEM FOR FREE-SPACE OPTICAL COMMUNICATION SYSTEMS

(75) Inventor: Heinz Willebrand, Longmont, CO (US)

(73) Assignee: LightPointe Communications, Inc., San Diego, CA (US)

(*) Notice: Subject to any disclaimer, the term of this patent is extended or adjusted under 35 U.S.C. 154(b) by 90 days.

(21) Appl. No.: 09/835,866

(22) Filed: Apr. 16, 2001

(65) Prior Publication Data

US 2002/0149811 A1 Oct. 17, 2002

(51) Int. Cl.⁷ ............................................. H04B 10/00
(52) U.S. Cl. .................. 398/115; 398/118; 398/119; 398/120; 398/135; 398/17; 398/10; 398/13; 398/20; 398/22; 398/23; 398/24; 455/103; 455/74
(58) Field of Search ................................. 398/115, 118, 398/119, 120, 135, 17, 10, 13, 20, 22, 23, 24, 5, 121, 122, 124, 128, 129, 130, 131, 136; 455/103, 74, 428, 452, 427, 12.1, 13.1, 13.4; 370/338, 228, 216, 225, 226, 351, 352, 468

(56) References Cited

U.S. PATENT DOCUMENTS

| 4,330,870 A | 5/1982 | Arends |
| 4,689,482 A | 8/1987 | Horikawa et al. |
| 4,807,222 A | 2/1989 | Amitay |
| 4,904,993 A | 2/1990 | Sato |
| 4,916,460 A | 4/1990 | Powell |
| 5,005,937 A | 4/1991 | Aida et al. |
| 5,034,997 A | 7/1991 | Iwasaki |
| 5,060,303 A | 10/1991 | Wilmoth |
| 5,068,916 A | 11/1991 | Harrison et al. |
| 5,083,874 A | 1/1992 | Aida et al. |

(Continued)

FOREIGN PATENT DOCUMENTS

| DE | 44 33 896 C1 | 11/1995 |
| EP | 0 513 993 A2 | 11/1992 |
| EP | 0 378 148 B1 | 4/1996 |
| GB | 2 221 810 A | 2/1990 |
| GB | 2 257 321 A | 1/1993 |
| GB | 2297668 A | 8/1996 |
| JP | S63-215125 | 9/1988 |
| WO | WO 98/32250 | 7/1998 |
| WO | WO 99/05802 | 2/1999 |
| WO | WO 00/08783 | 2/2000 |
| WO | WO 00/16489 | 3/2000 |
| WO | WO 00/54413 | 9/2000 |
| WO | WO 01/52450 A2 | 7/2001 |

OTHER PUBLICATIONS

U.S. Appl. No. 60/276,610, filed Mar. 16, 2001, Shah et al.
U.S. Appl. No. 60/256,540, filed Dec. 18, 2000, Gupta et al.

(Continued)

*Primary Examiner*—Hanh Phan
(74) *Attorney, Agent, or Firm*—Fitch, Even, Tabin & Flannery

(57) ABSTRACT

A method of managing a free-space optical network includes monitoring environmental and weather conditions in the vicinity of one or more free-space optical links in the network. Data is gathered by environmental condition instruments, such as visibility meters, and is used to assess whether atmospheric conditions have deteriorated to the point where operation of one or more free-space links might be in jeopardy. If data from an environmental condition instrument falls below a predetermined level, network data traffic is routed over an alternate communication path, which may include radio frequency (RF) paths, fiber optic cables, wire cables, or other free-space links.

7 Claims, 5 Drawing Sheets

U.S. PATENT DOCUMENTS

| | | | |
|---|---|---|---|
| 5,142,400 A | 8/1992 | Solinsky | |
| 5,185,814 A | 2/1993 | Healey | |
| 5,210,631 A | 5/1993 | Huber et al. | |
| 5,218,467 A | 6/1993 | Ross et al. | |
| 5,227,906 A | 7/1993 | Tokumitsu | |
| 5,247,381 A | 9/1993 | Olmstead et al. | |
| 5,280,184 A | 1/1994 | Jokerst et al. | |
| 5,301,054 A | 4/1994 | Huber et al. | |
| 5,321,718 A | 6/1994 | Waarts et al. | |
| 5,329,576 A | 7/1994 | Handforth | |
| 5,331,449 A | 7/1994 | Huber et al. | |
| 5,371,734 A | 12/1994 | Fischer | |
| 5,390,040 A | 2/1995 | Mayeux | |
| 5,400,166 A | 3/1995 | Huber | |
| 5,416,627 A | 5/1995 | Wilmoth | |
| 5,416,861 A | 5/1995 | Koh et al. | |
| 5,416,864 A | 5/1995 | Cassidy et al. | |
| 5,443,227 A | 8/1995 | Hsu | |
| 5,448,391 A | 9/1995 | Iriyama et al. | |
| 5,452,124 A | 9/1995 | Baker | |
| 5,457,562 A | 10/1995 | Tremblay | |
| 5,475,520 A | 12/1995 | Wissinger | |
| 5,526,161 A | 6/1996 | Suzuki et al. | |
| 5,548,772 A | 8/1996 | Lin et al. | |
| 5,574,589 A | 11/1996 | Feuer et al. | |
| 5,585,953 A * | 12/1996 | Zavrel | 359/152 |
| 5,587,830 A | 12/1996 | Chraplyvy | |
| 5,596,661 A | 1/1997 | Henry et al. | |
| 5,654,816 A | 8/1997 | Fishman | |
| 5,659,413 A | 8/1997 | Carlson | |
| 5,661,582 A | 8/1997 | Kintis et al. | |
| 5,710,652 A | 1/1998 | Bloom et al. | |
| RE35,736 E | 2/1998 | Powell | |
| 5,748,813 A | 5/1998 | Cassidy et al. | |
| 5,777,768 A | 7/1998 | Korevaar | |
| 5,786,923 A | 7/1998 | Doucet et al. | |
| 5,790,286 A * | 8/1998 | Bae | 359/110 |
| 5,818,619 A | 10/1998 | Medved et al. | |
| 5,818,984 A | 10/1998 | Ahmad et al. | |
| 5,838,470 A | 11/1998 | Radehaus et al. | |
| 5,844,705 A | 12/1998 | Rutledge | |
| 5,859,725 A | 1/1999 | Sugiya et al. | |
| 5,883,730 A | 3/1999 | Coult et al. | |
| 5,917,629 A | 6/1999 | Hortensius et al. | |
| 5,936,578 A | 8/1999 | Driessen et al. | |
| 5,946,120 A | 8/1999 | Chen | |
| 5,949,563 A * | 9/1999 | Takada | 359/124 |
| 5,949,564 A | 9/1999 | Wake | |
| 5,966,229 A * | 10/1999 | Dodley et al. | 359/187 |
| 5,978,118 A | 11/1999 | Flaherty | |
| 5,983,068 A | 11/1999 | Tomich et al. | |
| 5,995,253 A | 11/1999 | Flaherty | |
| 6,014,236 A | 1/2000 | Flaherty | |
| 6,016,212 A | 1/2000 | Durant et al. | |
| 6,043,918 A * | 3/2000 | Bozzay et al. | 359/172 |
| 6,049,593 A | 4/2000 | Acampora | |
| 6,104,513 A | 8/2000 | Bloom | |
| 6,115,157 A | 9/2000 | Barnard et al. | |
| 6,122,084 A | 9/2000 | Britz et al. | |
| 6,141,128 A * | 10/2000 | Korevaar et al. | 359/152 |
| 6,239,888 B1 | 5/2001 | Willebrand | |
| 6,272,271 B1 | 8/2001 | Wojnarowski et al. | |
| 6,285,481 B1 | 9/2001 | Palmer | |
| 6,288,813 B1 * | 9/2001 | Kirkpatrick et al. | 359/152 |
| 6,301,037 B1 | 10/2001 | Fischer et al. | |
| 6,323,980 B1 | 11/2001 | Bloom | |
| 6,348,986 B1 | 2/2002 | Doucet et al. | |
| 6,366,723 B1 | 4/2002 | Medved et al. | |
| 6,381,055 B1 | 4/2002 | Javitt et al. | |
| 6,396,612 B1 * | 5/2002 | Bjorndahl | 359/172 |
| 6,398,425 B2 | 6/2002 | Williams et al. | |
| 6,411,414 B1 | 6/2002 | Abate et al. | |
| 6,452,700 B1 | 9/2002 | Mays, Jr. | |
| 6,462,847 B2 | 10/2002 | Willebrand | |
| 6,493,121 B1 | 12/2002 | Althaus | |
| 6,509,992 B1 | 1/2003 | Goodwill | |
| 6,583,904 B1 | 6/2003 | Mahlab et al. | |
| 6,587,687 B1 * | 7/2003 | Wiedeman | 455/428 |
| 6,763,195 B1 | 7/2004 | Willebrand et al. | |
| 2002/0005972 A1 | 1/2002 | Bloom et al. | |
| 2002/0027691 A1 | 3/2002 | Medved et al. | |
| 2002/0028043 A1 | 3/2002 | Medved et al. | |
| 2002/0048066 A1 | 4/2002 | Antoniades et al. | |
| 2002/0051269 A1 | 5/2002 | Margalit et al. | |
| 2002/0054411 A1 | 5/2002 | Heminger et al. | |
| 2002/0054413 A1 | 5/2002 | Shivnan | |
| 2002/0075542 A1 * | 6/2002 | Kumar et al. | |
| 2002/0122230 A1 * | 9/2002 | Izadpanah et al. | |
| 2002/0122232 A1 | 9/2002 | Doucet et al. | |
| 2002/0141020 A1 | 10/2002 | Doucet et al. | |
| 2002/0152320 A1 * | 10/2002 | Lau | |
| 2004/0037566 A1 | 2/2004 | Willebrand et al. | |
| 2004/0208591 A1 | 10/2004 | Willebrand et al. | |

OTHER PUBLICATIONS

Hungarian Patent Office; Search Report for Hungarian National Phase of PCT/US00/35198, which claims priority to related U.S. Appl. No. 09/482,782; dated Jan. 15, 2003; pp. 1–3.

PCT International Search Authority; "Notification of Transmittal of the International Search Report"; "PCT International Search Report" for International Application No. PCT/US02/10075 which corresponds to U.S. Appl. No. 09/835,866; mailed Jul. 30, 2002; (4 pages).

PCT International Search Authority; "Notification of Transmittal of the International Search Report"; "PCT International Search Report" for International Application No. PCT/US00/35198 which claims priority to related U.S. Appl. No. 09/482,782; mailed Feb. 6, 2002; (7 pages).

G. Nykolak et al.; "A 40 Gb/S DWDM Free Space Optical Transmission Link Over 4.4 km"; In Free–Space Laser Communication Technologies XII; *Proceeding of SPIE*; vol. 3932; 2000; pp. 16–20.

P. F. Szajowski et al.; "Key Elements of High–Speed WDM Terrestrial Free–Space Optical Communications Systems"; In Free–Space Laser Communication Technologies XII; *Proceedings of SPIE*; vol. 3932; 2000; pp. 2–14.

G. Nykolak et al.; Update on 4×2.5 Gb/s, 4.4km free–space optical communications link: availability and scintillation performance; Part of the SPIE Conference on Optical Wireless Communications II; *SPIE*; vol. 3850; Sep. 1999; pp. 11–19.

P. F. Szajowski et al.; "High Power Optical Amplifiers Enable 1550 nm Terrestrial Free–Space Optical Data–Links Operating @ WDM 2.5 Gb/s Data Rates"; Part of the SPIE Conference on Optical Wireless Communications II; *SPIE*; vol. 3850; Sep. 1999; pp. 2–10.

Australian Patent Office, "Examiner's first report on patent application no. 2001252868 by LIghtPointe Communications, Inc.", dated May 19, 2004, for Australian Application No. 2001252868 which relates and corresponds to U.S. Appl. Nos. 09/482,782 and 10/840,172, with copy of examined claims, 11 pages.

United States Patent and Trademark Office, "Office Action" for U.S. Appl. No. 10/646,994, mailed Aug. 24, 2004, 11 pages.

Nasa Jet Propulsion Laboratory; "Multiple–Beam Transmission for Optical Communication"; http://www.nasatech.com/Briefs/Nov98/NPO20384.html; pp. 1–2; (Oct. 26, 2001).

P. S. Guilfoyle et al.; "Free–Space Interconnects for High–Performance Optoelectronic Switching"; *Computer; IEEE*; pp. 69–75; (Feb. 1998).

I. I. Kim et al.; "Scintillation Reduction Using Multiple Transmitters"; *Society of Photo–Optical Instrumentation Engineers*, vol. 2990; pp. 102–113 (1997).

S. Hollung et al.; A Bi–Directional Quasi–Optical Lens Amplifier, *IEEE Transactions on Microwave Theory and Techniques*; vol. 45; No. 12; pp. 2352–2357; (Dec. 1997).

C. M. Stickley et al.; "Demonstration of an Adaptive, Coherent–Combining Laser Receiver"; $18^{th}$ *International Laser Radar Conference*; pp. 247–250; (1996).

A. Belmonte et al.; "Performance of a Multiple–Aperture Optical System"; *Society of Photo–Optical Instrumentation Engineers*, vol. 2699; pp. 316–326; (1996).

A. Louri et al.; "Feasibility Study for a Scalable Optical Interconnection Network for Massively Parallel Processing Systems"; *Applied Optics*, vol. 35, No. 8; pp. 1296–1308; (Mar. 10, 1996).

E. Korevaar et al.; "Design of Satellite Terminal for BMDO Lasercom Technology Demonstration"; *Society of Photo–Optical Instrumentation Engineers*, vol. 2381; pp. 59–71; (Feb. 7–8, 1995).

K. H. Kudielka et al.; "Experimental Verification of an Adaptive Optical Multi– Aperture Receive Antenna for Laser Space Communications"; *Society of Photo–Optical Instrumentation Engineers*, vol. 2123; pp. 478–483; (1994).

A. S. Acampora; "The Scalable Lightwave Network"; *IEEE Communications Magazine*; pp. 36–42; (Dec. 1994).

C. Brackett et al; "A Scalable Multiwavelength Multihop Optical Network: A Proposal for Research on All–Optical Networks"; *Journal of Lightwave Technology*, vol. 11, No. 5/6; pp. 736–753; (May/Jun. 1993).

J. H. Churnside; "Aperture Averaging of Optical Scintillations in the Turbulent Atmosphere"; *Applied Optics*, vol. 30, No. 15; pp. 1982–1994; (May 20, 1991).

J. Shamir et al.; "Diversity Methods for Fading Control"; *Applied Optics*; vol. 27, No. 8; pp. 1389–1391; (Apr. 15, 1988).

A. S. Acampora; "A Multichannel Multihop Local Lightwave Network"; Globecom '87; *IEEE*; pp. 1459–1467; (1987).

D. L. Fried; "Aperture Averaging of Scintillation"; *Journal of the Optical Society of America* ; vol. 57, No. 2; pp. 169–175; (Feb. 1967).

Kimura et al.; "Global Satellite communication network using double–layered inclined orbit constellation with optical inter–satellite links"; ATR Optical and Radio Communications Research Laboratories, Kyoto, Japan; *SPIE*; vol. 2699; May 1996; pp. 12–23.

Kimura et al.; "Satellite constellation of low earth orbit (LEO) satellite global communication network using optical inter–satellite links"; ATR Optical and Radio Communications Research Laboratories, Kyoto, Japan; *SPIE*; vol. 2381; Sep. 1995; pp. 48–59.

Lightpointe Communications, Inc.; "Complex Networking Connectivity Example: Allianz Insurance Germany"; 1995; p. 1.

Kube; "Renaissance Eines Alten Konzepts"; *Nachrichten Elektronik und Telematick*; vol. 49; No. 5; May 1995; pp. 15, 16 and 18. (English translation provided.).

TELECONNECT GmbH; "Optische Freiraum–Übertragungssysteme"; Teleconnect Verbindungen in die Zukunft; Produktinformation; Apr. 1995; pp. 1–16. (English translation provided.).

CBL—Communication by Light, Gesellschaft für optische Kommunikationssysteme mbH; "Optical Links, Network connection directly through the atmosphere"; Mar. 1995; pp. 1–8.

Turinsky; "Kabellose Übertragung von Digital–Audio– und Videosignalen"; Praxis; *RFE*; Mar. 1994; pp. 33–34. (English translation provided.).

TELECONNECT GmbH; "Installation Mittweida 1993" (digitized photograph copies); 1993; pp. 1–2.

Bruno et al.; "Diode Laser Spatial Diversity Transmitter"; TRW Space & Technology Group; *SPIE Optomechanical Design of Laser Transmitters and Receivers*; vol. 1044; 1989; pp. 187–194.

Korevaar et al.; "Status of BMDO/IST Lasercom Advanced Technology Demonstration"; *SPIE–The International Society for Optical Engineering*, vol. 2123; Society of Photo–Optical Instrumentation Engineers, Washington, USA; 1994; pp. 96–107.

U.S. Appl. No. 09/482,782, filed Jan. 13, 2000, Willebrand et al.

Korevaar, et al., Status of SDIO/IS&T Lasercom Testbed Program, SPIE–The International Society for Optical Engineering, Jan. 20–21, 1993, pp. 116–127, vol. 1866, Society of Photo–Optical Instrumentation Engineers, Washington, USA.

Korevaar, et al., Status of BMDO/IST Lasercom Advanced Technology Demonstration, SPIE–The International Society for Optical Engineering, pp. 96–107, vol. 2123, Society of Photo–Optical Instrumentation Engineers, Washington, USA.

Schuster, et al., Optomechanical Design of STRV–2 Lasercom Transceiver Using Novel Azimuth/slant gimbal, SPIE–the International Society for Optical Engineering, Jan. 30–31–1996, pp. 227–239, vol. 2699, Society of Photo–Optical Instrumentation Engineers, Washington, USA.

Wilson, et al., Preliminary Results of the Ground/Orbiter Lasercomm Demonstration Experiment Between Table Mountain and the ETS–VI Satellite, SPIE–the International Society for Optical Engineering, Jan. 30–31, 1996, pp. 121–132, vol. 2699, Society of Photo–Optical Instrumentation Engineers, Washington, USA.

European Patent Office, "European Search Report", dated Nov. 4, 2004, for EP Application No. 03013313.6–2415, 5 pp.

European Patent Office, "European Search Report", dated Nov. 4, 2004, for EP Application No. 03019847.1–2415, 5 pp.

* cited by examiner

INTEGRATED ENVIRONMENTAL CONTROL AND MANAGEMENT SYSTEM FOR FREE-SPACE OPTICAL COMMUNICATION SYSTEMS

BACKGROUND OF THE INVENTION

1. Field of the Invention

The present invention relates generally to optical communication, and more specifically to free-space optical networking.

2. Discussion of the Related Art

Free-space optical communications systems use high power laser sources to transmit beams of modulated light through free-space (air).

Such systems are capable of transmitting an enormous amount of information and can be used to interconnect network segments in complex networking infrastructures.

The laser beams that carry the information in a free-space optical communication system typically operate in the infrared spectral range. Disadvantageously, the scattering and absorption coefficients of infrared light beams passing through the atmosphere can be rather high and this can adversely affect the transmitted light, which can impact the system availability. This is especially true when small particles such as fog, steam, dust, or aerosol particles are present in the atmosphere.

In order to overcome these and other disadvantages, it would be highly desirable to manage a free-space optical network in a manner that avoids the adverse consequences that the environment/atmosphere can have on the transmitted light beams. Thus, there is a need for a method and/or system for providing such free-space optical network management.

SUMMARY OF THE INVENTION

The present invention advantageously addresses the needs above as well as other needs by providing a method of managing a free-space optical network. The method includes the steps of: directing network data traffic over one or more free-space optical links in the free-space optical network; monitoring one or more environmental conditions in a vicinity of at least one of the one or more free-space optical links; and routing the network data traffic through an alternate communication path in response to data obtained from the step of monitoring one or more environmental conditions in a vicinity of at least one of the one or more free-space optical links.

In another embodiment, the invention provides a method of managing a free-space optical network. The method includes the steps of: directing network data traffic over one or more free-space optical links in the free-space optical network; monitoring one or more environmental conditions in a vicinity of at least one of the one or more free-space optical links; attempting to adjust one or both of a transmission power and receive sensitivity of one or more of the free-space optical links in response to data obtained from the step of monitoring one or more environmental conditions in a vicinity of at least one of the one or more free-space optical links; and routing the network data traffic through an alternate communication path in response to a failure in the step of attempting to adjust.

In another embodiment, the invention can be characterized as a system for managing a free-space optical network. The system includes means for monitoring one or more environmental conditions in a vicinity of at least one of one or more free-space optical links in the free-space optical network, and means for routing network data traffic through an alternate communication path in response to data obtained from the means for monitoring one or more environmental conditions in a vicinity of at least one of one or more free-space optical links in the free-space optical network.

In another embodiment, the invention provides a method of managing a free-space optical network that includes the steps of: directing network data traffic over one or more free-space optical links in the free-space optical network; monitoring one or more environmental conditions in a vicinity of at least one of the one or more free-space optical links; sending an alarm over the free-space optical network in response to data obtained from the step of monitoring one or more environmental conditions in a vicinity of at least one of the one or more free-space optical links; routing the network data traffic through an alternate communication path in response to the alarm; and rerouting the network data traffic over the one or more free-space optical links in the free-space optical network in response to additional data obtained from monitoring one or more environmental conditions in a vicinity of at least one of the one or more free-space optical links.

In yet another embodiment, the invention provides a method of managing a free-space optical network that includes the steps of: directing network data traffic over one or more free-space optical links in the free-space optical network; monitoring one or more environmental conditions in a vicinity of at least one of the one or more free-space optical links; sending an alarm over the free-space optical network in response to data obtained from the step of monitoring one or more environmental conditions in a vicinity of at least one of the one or more free-space optical links; selecting an alternate communication path for the network data traffic in response to the alarm; routing the network data traffic through the alternate communication path; re-evaluating the alternate communication path selection; and rerouting the network data traffic over the one or more free-space optical links in the free-space optical network in response to additional data obtained from monitoring one or more environmental conditions in a vicinity of at least one of the one or more free-space optical links.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is not to be taken in a limiting sense, but is made merely for the purpose of describing the general principles of the invention. The scope of the invention should be determined with reference to the claims.

In order to manage a free-space optical network in a manner that avoids the adverse consequences of inclement weather and other difficult atmospheric conditions, there is needed a way to detect that atmospheric conditions have deteriorated to the point where the transmitted beams might be adversely affected. One way to detect such deterioration is to measure the received signal power at one end of a free-space link in order to determine whether or not there is any path attenuation. One complication with this approach, however, is that it is difficult to determine whether or not any decrease in receive power is due to weather conditions or due to an alignment problem or due to another possible failure of the system that might not be related to weather impact. For example, an alignment problem with one of the free-space transceivers can also reduce the received power.

Another way to detect deterioration of atmospheric conditions is to use visibility data. Specifically, small particles in the atmosphere, such as for example fog, steam, dust, or aerosol particles, impact visibility. Visibility data can be used to characterize an availability figure of a free-space optical link in a specific deployment area. Visibility data has been collected by government agencies for a long period of time, and airports are typically used as geographical reference points. Unfortunately, the visibility data at airport locations can be quite different from the weather conditions in downtown or business park areas where the actual installation of a free-space optical communication system typically takes place. These microclimate effects complicate the process of calculating reliable availability figures in areas that are not located close to airports with well-known visibility data.

Figure 1:
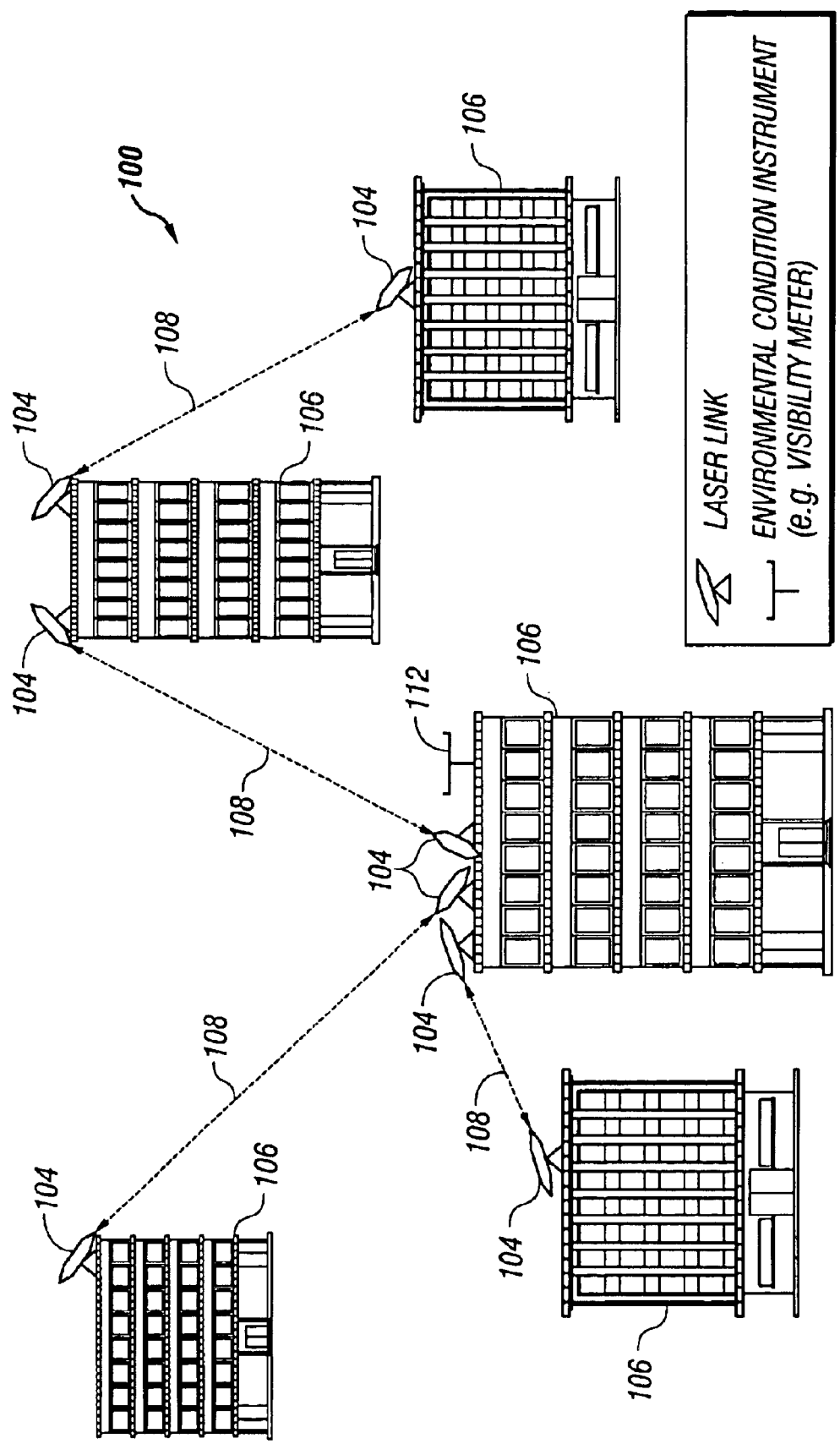
FIG. 1 is a pictorial diagram illustrating a free-space optical communication network that incorporates a free-space optical network management system made in accordance with an embodiment of the present invention.
Figure 2:
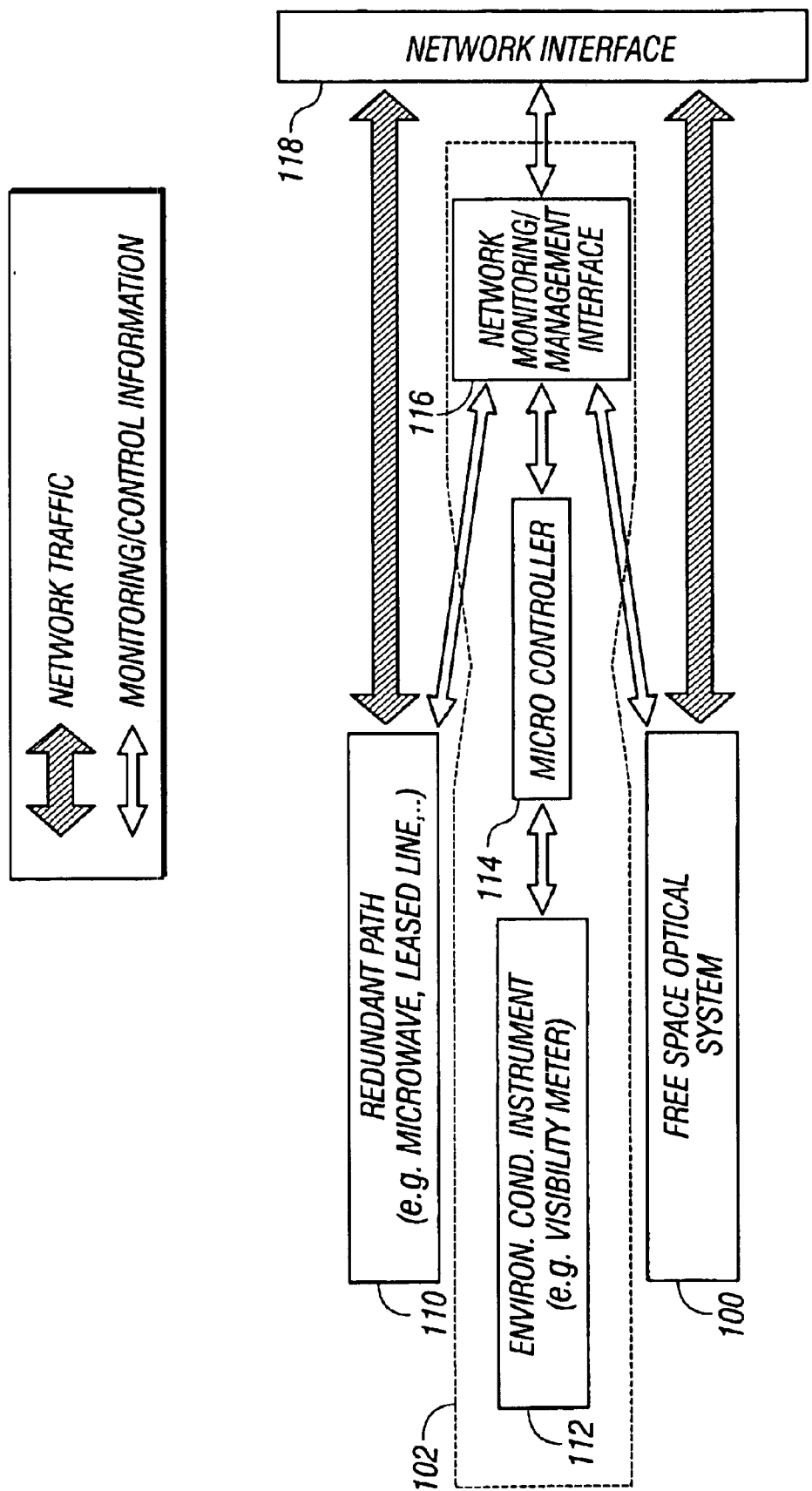
FIG. 2 is a block diagram illustrating an exemplary version of a free-space optical network management system made in accordance with an embodiment of the present invention.

Referring to FIGS. 1 and 2, there is illustrated a free-space optical communication system or network 100 that incorporates a free-space optical network management system 102 made in accordance with an embodiment of the present invention. The network 100 includes several optical transceivers 104 mounted on several buildings 106 for communicating optical signals over several free-space links 108. The free-space links 108 are used to connect the multiple buildings 106 within a high-speed wireless optical network. A typical application for the network 100 is in a metropolitan area or a campus like environment.

By way of example, the optical transceivers 104 may use methods or comprise devices of the type disclosed in the following two United States patent applications, the entire contents of which are hereby fully incorporated into the present application by reference: U.S. patent application Ser. No. 09/065,685, filed Apr. 24, 1998, entitled TERRESTRIAL OPTICAL COMMUNICATION NETWORK OF INTEGRATED FIBER AND FREE-SPACE LINKS WHICH REQUIRES NO ELECTRO-OPTICAL CONVERSION BETWEEN LINKS, by inventor Heinz Willebrand; and U.S. patent application Ser. No. 09/482,782, filed Jan. 13, 2000, entitled HYBRID WIRELESS OPTICAL AND RADIO FREQUENCY COMMUNICATION LINK, by inventors Heinz Willebrand and Maha Achour.

In general, the free-space optical network management system 102 automatically collects weather data and manages the free-space optical communication network 100 depending on current weather conditions. The management system 102 preferably uses the measurements of actual atmospheric and environmental conditions in the area of deployment in an automatic feedback and control system to manage the free-space optical network 100. This technique allows for taking microclimate effects into account. The management system 102 significantly increases the overall network 100 availability by using alternate or redundant routing paths 110 in case of a potential system loss due to environmental conditions. This improves the predictability of the availability of the network 100.

In order for the management system 102 to use measurements of actual atmospheric or environmental conditions in the area of deployment, one or more environmental condition instruments 112 are installed in the vicinity of one or more of the free-space links 108. For example, the environmental condition instrument 112 may be installed on one of the buildings 106, preferably a building in or near the center of the network 100. The environmental condition instrument 112 may comprise any type of instrument or sensor for measuring any type of atmospheric, environmental, weather or climate condition. For example, the environmental condition instrument 112 may comprise a visibility meter for measuring visibility data, a weather sensor for measuring wind speed and/or wind direction, a pressure meter, a temperature sensor, etc. In environments with strong microclimate effects, multiple environmental condition instruments may be used and networked together through the management system 102 to improve the overall network 100 availability.

The one or more environmental condition instruments 112 collect measurement data corresponding to selected atmospheric or environmental conditions in the area of deployment and preferably provide this measurement data to the network 100. This way, the weather information collected by the environmental condition instruments 112 is accessible from a remote location. Thus, by providing the measurement data to the network 100, the measurement data is available "online". By way of example, the environmental condition instruments 112 may be coupled to a micro-controller 114 via standard network connections such as RS232 or Ethernet. The micro-controller 114 is preferably coupled to the network 100 through a network monitoring/management interface 116 and a main network interface 118. The main network interface 118 is used to route data traffic between the free-space optical communication network 100 and the alternate (or redundant) communication path 110.

The alternate communication path 110 may comprise many different types of communication paths. For example, the alternate communication path 110 may comprise an independent wireless system such as a radio frequency (RF) or microwave system, fiber optic based system, wire based system, leased line, etc. The alternate communication path 110 preferably comprises a type of communication path that is independent of the troublesome environmental conditions, i.e., a communication path that is not affected by the same environmental or weather conditions. The alternate communication path 110 may even comprise a different free-space link in a different geographic location that is not subject to the same environmental conditions.

Figure 3:
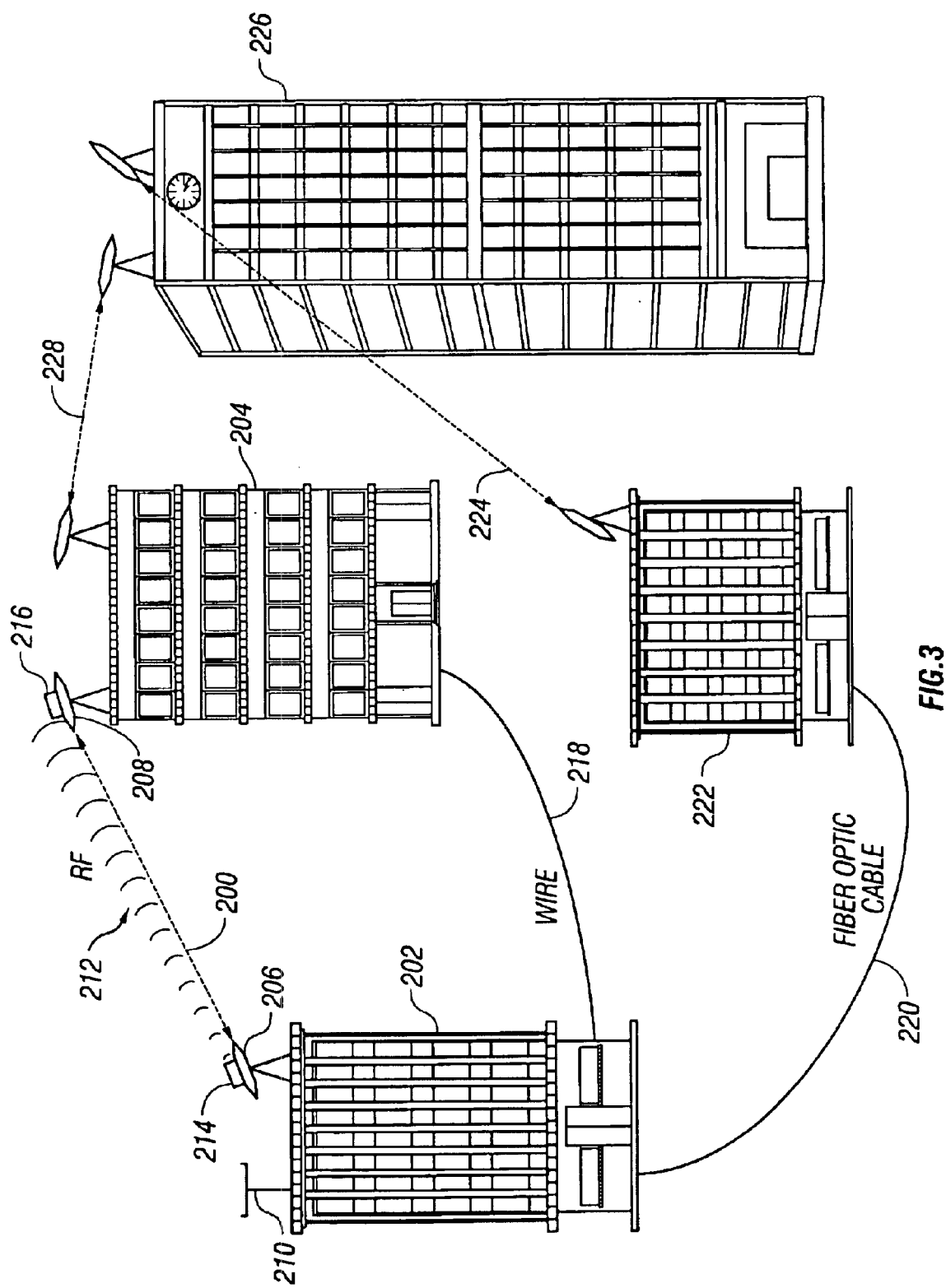
FIG. 3 is a pictorial diagram illustrating several different types of alternative communication paths that may be used with the free-space optical network management system of FIG. 2.

FIG. 3 illustrates examples of some of the different types of alternate communication paths that may be employed. For this example, assume that the network data traffic is initially being directed over the free-space link 200 between buildings 202, 204 by means of the optical transceivers 206, 208. If an environmental condition instrument, such as for example a visibility meter 210, indicates that the visibility has deteriorated to the point where operation of the free-space link 200 might be in jeopardy, the management system 102 may eventually determine that the network data traffic should be routed over an alternate communication path.

One such alternate communication path could be an RF communication path 212. By way of example, the RF communication path 212 may be implemented with RF transceivers 214, 216 mounted on the optical transceivers 206, 208, respectively. By way of further example, the RF communication path 212 may be provided by devices of the type described in the aforementioned U.S. patent application Ser. No. 09/482,782. Another such alternate communication path could be provided by a wire cable 218 that runs between the buildings 202, 204. Similarly, if there were a fiber optic cable running between the buildings 202, 204, it could also be used as the alternate communication path.

The alternate communication path may also make use of different modes of communication and/or be routed to the destination in an indirect manner. For example, the network data traffic could be routed over a fiber optic cable 220 from building 202 to building 222. From there, the network data traffic could be routed over a free-space link 224 to building 226, and then over another free-space link 228 to the destination building 204. Use of the free-space links 224, 228 may be possible if they are not affected by the same microclimate affecting the free-space link 200. This may be the case since the visibility meter 210 is installed on building 202, which could be more than two miles away from buildings 204, 222, 226. Additional visibility meters could be installed on one or more of the other buildings 204, 222, 226 in order to more closely pinpoint the location of the adverse environmental conditions. If fiber optic cable, wire cable, RF communication paths, or some other type of communication path existed between buildings 222, 226, 204, then one or more of those modes of communication could be used to complete the alternate communication path instead of the free-space links 224, 228.

Figure 4:
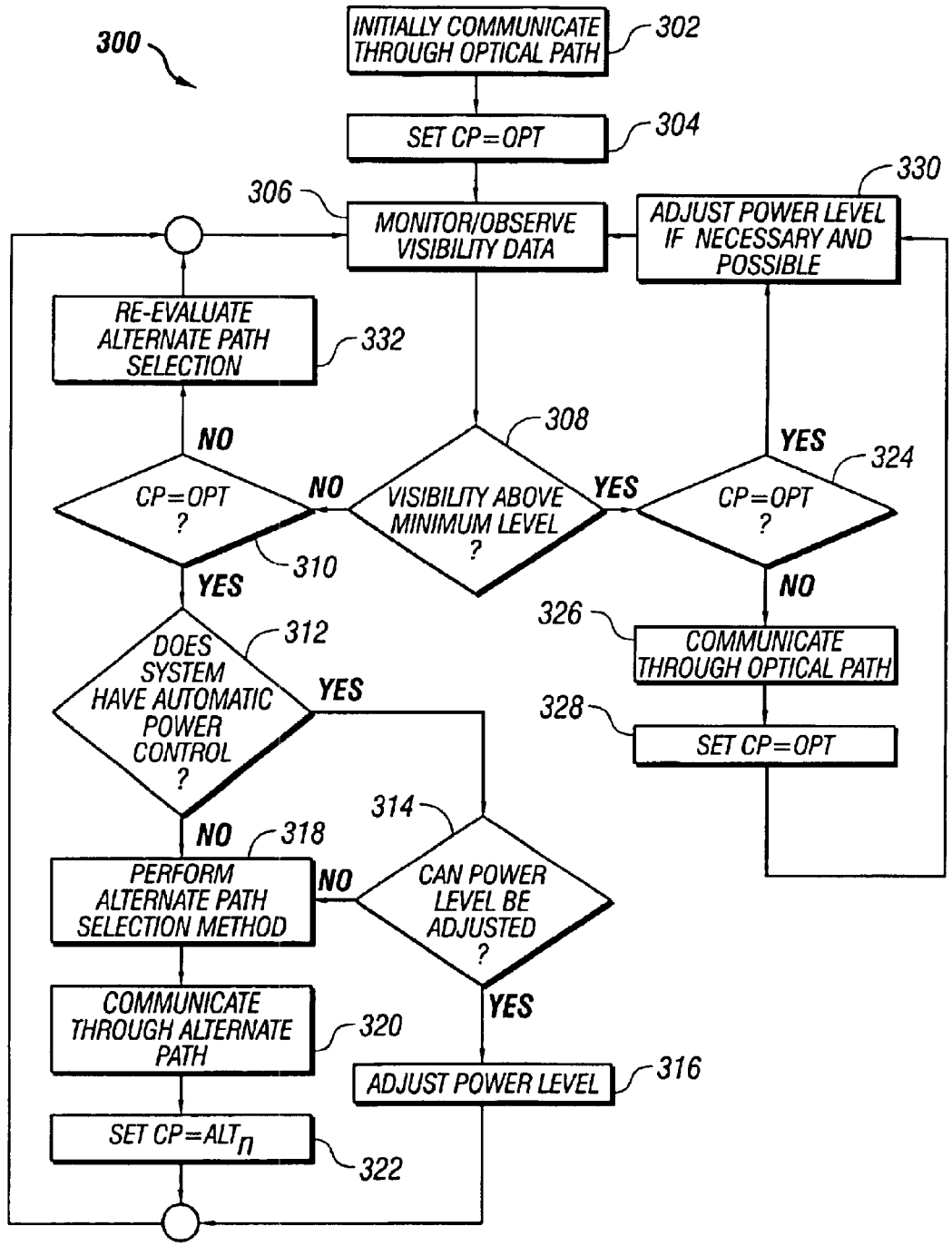
FIG. 4 is a flowchart illustrating an exemplary method of operation of a free-space optical network management system in accordance with an embodiment of the present invention.

Referring to FIG. 4, there is illustrated an exemplary method of operation 300 for the free-space optical network management system 102 (FIG. 2) in accordance with an embodiment of the present invention. The monitoring facility that implements the method 300 may be a standard network management software program, such as simple network management protocol (SNMP), or a hardware based management facility/system. As indicated in step 302, the network data traffic is typically first directed over the optical path, i.e., one or more free-space links. The management system 102 can keep track of whether the optical path or an alternate path is currently being used by, for example, setting a variable or flag such as communication path (CP)=optical (OPT), as indicated in step 304.

While the network data traffic is being communicated over either the optical path (i.e., free-space links) or an alternate communication path, the management system 102 monitors or observes one or more environmental conditions in the vicinity of at least one of the free-space links, as indicate by step 306. Measurements of such conditions are taken by one or more environmental condition instruments that are preferably located in the vicinity of at least one of the free-space links. The data generated by the environmental condition instruments is provided online in the network 100. As part of the monitoring function of step 306, the micro-controller 114 preferably polls the environmental condition instruments and stores weather related information in a memory. If measurement data corresponding to selected ones of the environmental conditions falls below a predetermined level, the micro-controller 114 sends out an alarm (or trap) to the monitoring facility. For example, an alarm could be generated if visibility reaches a certain predefined minimum value. For the remainder of this discussion it will be assumed that a visibility meter is used as the environmental condition instrument(s), but it should be well understood that other types of instruments and meters may be used as described above.

The comparison of the measurement data to the predetermined level is illustrated in step 308 where it is determined whether or not the visibility as measured by the visibility meter is above a minimum level. If the visibility is not above the minimum level, then an alarm (or trap) is generated. When the monitoring facility receives an alarm, the management system 102 first checks to see if the optical (free-space) path is currently being used as the communication path for the network data traffic, as indicated by step 310. If so, then the management system 102 performs certain countermeasures to prevent the failure of the communication link.

In one embodiment of the present invention, one such countermeasure is to attempt to increase the transmission power or the receive sensitivity of one or more of the free-space optical communication links to improve the link budget. Increasing the power of the laser transmitter and/or increasing the sensitivity of the laser receiver is one procedure that can be used to counteract the potential loss of the communication link due to adverse weather conditions. Thus, in step 312 the management system 102 checks to see if the free-space system even has such automatic power control. If so, then in step 314 the management system 102 checks whether or not the power level can be adjusted. Specifically, this power adjustment procedure may not be effective because the system has already reached its transmitter and/or receiver limitation. If the power level or receive sensitivity can be adjusted, then such adjustment takes place in step 316 and control is passed back to the monitoring step 306.

If the free-space system does not have automatic power control, or the power level and receive sensitivity cannot be adjusted, the network traffic is routed or redirected through an alternate communication path. The management system 102 performs an alternate communication path selection method in step 318, an exemplary version of which is described in further detail below. In step 320 the network traffic is routed or redirected through the selected alternate communication path. The flag CP is set equal to $ALT_n$ in step 322, where n indicates the selected alternate communication path. Monitoring of the visibility data then continues in step 306.

In an alternative embodiment of the present invention, the countermeasure performed by the management system 102 is to switch immediately to an alternate communication path without performing prior power or sensitivity adjustment. Therefore, in such alternative embodiment steps 312, 314 and 316 would be eliminated and a "Yes" response to step 310 would pass control directly to step 318.

After a power adjustment has been made or an alternate communication path has been activated, the management system 102 continues to monitor the environmental conditions in step 306. If measurement data collected by the visibility meter (or other environmental condition instrument) indicates that the environmental conditions are back to a level to where the free-space optical network 100 can function properly, the micro-controller notifies the monitoring facility. Thus, such notification is generated if in step 308 it is determined that the visibility is above the minimum level. If so, then in step 324 the management system 102 checks whether or not the optical (free-space) path is currently being used as the communication path for the network data traffic. If CP=ALT$_n$, then an alternate communication path is currently being used instead of the optical (free-space) path. In this scenario the management system 102 reactivates the optical path and redirects the network data traffic over the free-space links, as indicated by step 326. In step 328 the flag CP is set equal to OPT in order to indicate that the optical path is currently being used as the communication path.

If in step 324 the management system 102 determines that CP=OPT, indicating that the optical (free-space) path is currently being used as the communication path, then no change in the communication path is needed since visibility is above the minimum level, as determined by step 308. While no change in the communication path is needed, it may be desirable to adjust the power level or sensitivity of the free-space link. Specifically, if power level or sensitivity was previously adjusted in step 316 because the visibility was previously below the minimum level, then it may be desirable to re-adjust the power level or sensitivity once the visibility rises back above the minimum level. Such adjustments can be made in step 330. Furthermore, such adjustments may be desirable after switching back to the optical path from the alternate path, and therefore, control is passed from step 328 to step 330. It should be well understood, however, that step 330 is an optional feature of the present invention.

During the time that the network traffic is being routed through an alternate communication path, it may be desirable to re-evaluate the alternate communication path selection. Thus, if in steps 308 and 310 it is determined that visibility continues to be below the minimum level and that an alternate communication path is already being used for the network traffic, the selection of the specific alternate communication path can be re-evaluated in step 332. Such re-evaluation may be desirable in view of changes in data rate requirements of the network traffic, duration of the poor visibility or other inclement weather conditions, costs associated with the current alternate communication path, etc. By way of example, the method used for the re-evaluation step 332 may be similar to, or the same as, the alternate path selection method 318.

Figure 5:
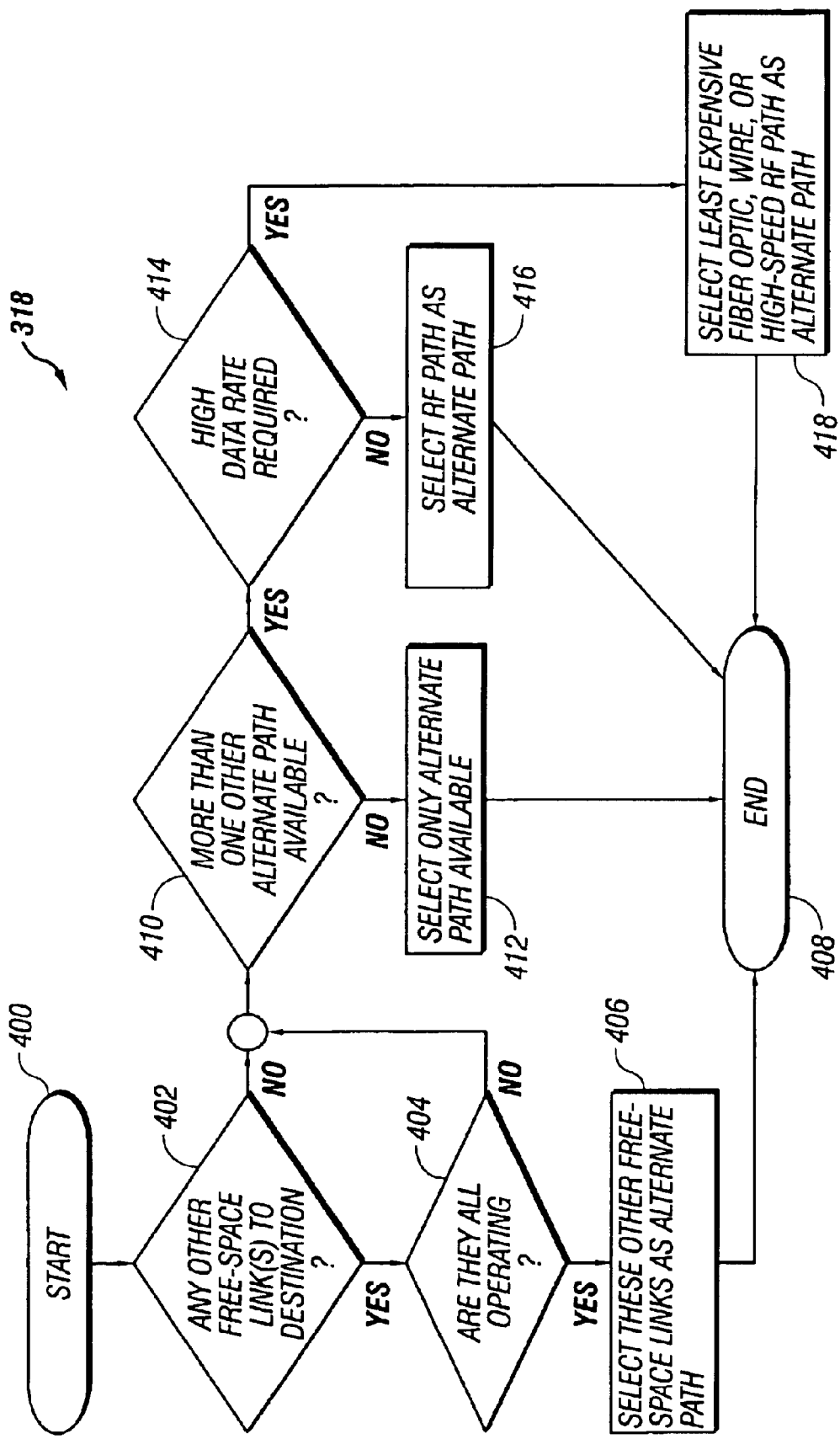
FIG. 5 is a flowchart illustrating an exemplary alternate communication path selection method in accordance with an embodiment of the present invention.

Referring to FIG. 5, there is illustrated an exemplary alternate communication path selection method 318 in accordance with an embodiment of the present invention. The method 318 starts at step 400. In step 402 the management system 102 determines whether or not any other free-space link(s) are available to the destination. If so, then in step 404 the management system 102 checks to see if these other free-space links are currently all operating. For example, these other free-space links may not be operating due to inclement weather conditions or other technical problems. Assuming that these other free-space links are all operating such that a complete path can be formed to the destination, then in step 406 they are selected as the alternate path. The method 318 ends in step 408 where control is passed to step 320 (FIG. 4).

If there are no other free-space links to the destination or they are not all operational, control is passed to step 410. In step 410 the management system 102 determines whether or not there is more than one alternate path available. If not, then the only available alternate path is selected in step 412. If there is more than one alternate path available, then in step 414 the management system 102 determines whether or not a high data rate is required. If a high data rate is not required, then, for example, a radio frequency (RF) path can be selected as the alternate path in step 416. If a high data rate is required, then in step 418 a fiber optic cable, wire, or a high-speed RF path can be selected as the alternate path. Preferably, the least expensive alternate path is selected. In some embodiments, the high-speed RF path may have a higher data rate than the wire path.

It was mentioned above that the data generated by the environmental condition instruments is provided online in the network 100. If the free-space optical communication network 100 is coupled to other networks, such as for example the Internet, then the environmental condition data, such as visibility data, will be accessible from nearly anywhere in the world. This allows the free-space optical network management system 102 to reside or be controlled from remote locations. In alternative embodiments of the present invention many different free-space optical communication networks, perhaps located in one or more countries, could be managed/controlled by one remote management system 102.

Thus, the free-space optical network management system and methods described herein use environmental, atmospheric, and/or weather conditions, such as visibility data, to actively manage/control the performance of free space optical links. Environmental condition instruments may be used within the free-space optical network to actively monitor the system and perform power adjustment within the system and/or switch to an alternate or redundant networking path. The environmental information may be provided online, and the network management system may use the online environmental information to manage one or more free space optical communication systems from a remote location.

While the invention herein disclosed has been described by means of specific embodiments and applications thereof, numerous modifications and variations could be made thereto by those skilled in the art without departing from the scope of the invention set forth in the claims.

What is claimed is:

1. A method of managing a free-space optical network, comprising the steps of:

directing network data traffic over one or more free-space optical links in the free-space optical network;

monitoring one or more environmental conditions in a vicinity of at least one of the one or more free-space optical links; and routing the network data traffic through an non-wireless alternate communication path in response to data obtained from the step of monitoring one or more environmental conditions in a vicinity of at least one of the one or more free-space optical links;

wherein the step of monitoring one or more environmental conditions comprises the step of collecting data indicative of at least one of the one or more environmental conditions with an instrument located in the vicinity of the at least one of the one or more free-space optical links;

wherein the step of monitoring one or more environmental conditions further comprises the step of:

sending an alarm over the free-space optical network in response to the data indicative of at least one of the one or more environmental conditions.

2. A method in accordance with claim 1, wherein the step of routing the network data traffic through an alternate communication path is performed in response to the alarm.

3. A method of managing a free-space optical network, comprising the steps of:

directing network data traffic over one or more free-space optical links in the free-space optical network;

monitoring one or more environmental conditions in a vicinity of at least one of the one or more free-space optical links;

sending an alarm over the free-space optical network in response to data obtained from the step of monitoring one or more environmental conditions in a vicinity of at least one of the one or more free-space optical links;

routing the network data traffic through a non-wireless alternate communication path in response to the alarm; and rerouting the network data traffic over the one or more free-space optical links in the free-space optical network in response to additional data obtained from monitoring one or more environmental conditions in a vicinity of at least one of the one or more free-space optical links.

4. A system in accordance with claim 3, wherein the alternate communication path comprises more than one mode of communication.

5. A method of managing a free-space optical network, comprising the steps of:

directing network data traffic over one or more free-space optical links in the free-space optical network;

monitoring one or more environmental conditions in a vicinity of at least one of the one or more free-space optical links;

sending an alarm over the free-space optical network in response to data obtained from the step of monitoring one or more environmental conditions in a vicinity of at least one of the one or more free-space optical links;

selecting an alternate communication path for the network data traffic in response to the alarm;

routing the network data traffic through the alternate communication path;

re-evaluating the alternate communication path selection; and rerouting the network data traffic over the one or more free-space optical links in the free-space optical network in response to additional data obtained from monitoring one or more environmental conditions in a vicinity of at least one of the one or more free-space optical links.

6. A system in accordance with claim 5, wherein the alternate communication path comprises more than one mode of communication.

7. A method in accordance with claim 3, wherein the step of routing the network data traffic through an alternate communication path further comprises the step of:

selecting the alternate communication path.

* * * * *